United States Patent
Arendt et al.

(10) Patent No.: US 6,314,526 B1
(45) Date of Patent: Nov. 6, 2001

(54) RESOURCE GROUP QUORUM SCHEME FOR HIGHLY SCALABLE AND HIGHLY AVAILABLE CLUSTER SYSTEM MANAGEMENT

(75) Inventors: James W. Arendt, Round Rock; Ching-Yun Chao; Rodolfo Ausgusto Mancisidor, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/113,674

(22) Filed: Jul. 10, 1998

(51) Int. Cl.[7] .................................................... H02H 3/05
(52) U.S. Cl. ................... 714/4; 707/10; 709/223
(58) Field of Search ............................ 714/4, 6; 707/10, 707/205; 712/20, 11; 709/223, 214

(56) References Cited

U.S. PATENT DOCUMENTS 6,038,677 * 3/2000 Lawlor et al. ............................ 714/4
6,058,490 * 5/2000 Allen et al. ............................... 714/9
6,108,699 * 8/2000 Moiin ..................................... 710/53

* cited by examiner

Primary Examiner—Robert Beausoleil
Assistant Examiner—Rita Ziemer
(74) Attorney, Agent, or Firm—Jeffrey S. LaBaw; Bracewell & Patterson, L.L.P.

(57) ABSTRACT

A cluster system is treated as a set of resource groups, each resource group including a highly available application and the resources upon which it depends. A resource group may have between 2 and M data processing systems, where M is small relative to the cluster size N of the total cluster. Configuration and status information for the resource group is fully replicated only on those data processing systems which are members of the resource group. In the event of failure of a data processing system within the cluster, only resource groups including the failed data processing system are affected. Each resource group having a quorum of its data processing systems available continues to provide services, allowing many applications within the cluster to continue functioning while the cluster is restored.

18 Claims, 7 Drawing Sheets

RESOURCE GROUP QUORUM SCHEME FOR HIGHLY SCALABLE AND HIGHLY AVAILABLE CLUSTER SYSTEM MANAGEMENT

The present invention is related to the subject matter of commonly assigned, copending U.S. patent applications Ser. No. 09/164,130 (Docket No. AT9-97-760) entitled "A Rule-Based Cluster System Management Model" and filed Sep. 30, 1998 and Ser. No. 09/114,051 (Docket No. AT9-97-761) entitled "A Highly Scalable and Highly Available Cluster System Management Scheme" and filed Jul. 10, 1998. The content of the above-referenced applications are incorporated herein by reference.

BACKGROUND OF THE INVENTION

1. Technical Field

The present invention relates in general to cluster system management and in particular to management of very large scale clusters. Still more particularly, the present invention relates to partially distributing cluster configuration information for managing a very large scale cluster.

2. Description of the Related Art

A cluster system, also referred to as a cluster multiprocessor system (CMP) or simply as a "cluster," is a set of networked data processing systems with hardware and software shared among those data processing systems, typically but not necessarily configured to provide highly available and highly scalable application services. Cluster systems are frequently implemented to achieve high availability, an alternative to fault tolerance for mission-critical applications such as aircraft control and the like. Fault tolerant data processing systems rely on specialized hardware to detect hardware faults and switch to a redundant hardware component, regardless of whether the component is a processor, memory board, hard disk drive, adapter, power supply, etc. While providing seamless cutover and uninterrupted performance, fault tolerant systems are expensive, due to the redundant hardware requirement, and fail to address software errors, a more common source of data processing system failure.

High availability utilizes standard hardware, but provides software allowing resources to be shared system wide. When a node, component, or application fails, an alternative path to the desired resource is quickly established. The brief interruption required to reestablish availability of the resource is acceptable in many situations. The hardware costs are significantly less than fault tolerant systems, and backup facilities may be utilized during normal operation. An example of the software utilized for these purposes is the HACMP (High Availability Cluster Multiprocessing) for AIX® (Advanced Interactive Executive) software available from International Business Machines Corporation of Armonk, N.Y. and the RS6000 SP software available from International Business Machines Corporation.

The cluster system management problem is a special class of the general system management problem, with additional resource dependency and management policy constraints. In particular, the maintenance of cluster configuration information required for system management poses a special problem. The cluster configuration information required for system management is typically stored in a database, which is either centralized or replicated to more than one data processing system for high availability. The data processing system which manages a centralized cluster configuration database becomes a potential bottleneck and a single point of failure.

To avoid the problems of a centralized cluster configuration database, the database may be replicated and maintained on a number of data processing systems within the cluster. In a small cluster, the system configuration and status information may be readily replicated to all data processing systems in the cluster for use by each data processing system in performing system management functions such as failure recovery and load balancing. Full replication provides a highly available cluster configuration database and performs adequately as long as the cluster size remains small (2 to 8 data processing systems). In a very large cluster, however, the costs associated with full replication are prohibitively high.

In order to keep a distributed database in a consistent state at all times, a two-phase commit protocol may be utilized. For a fully replicated database (i.e. every data processing system has a copy), 2N messages must be exchanged for each write operation, where N is the number of data processing systems in the cluster. Thus, while the size of a cluster configuration/status database grows linearly with respect to cluster size, access time to the database grows either linearly or logarithmically with respect to cluster size. Moreover, when bringing up a cluster, the number of events (and therefore the amount of status information which needs to be updated) grows linearly with respect to cluster size. Hence, the time or cost required to bring up a cluster with a fully replicated distributed cluster configuration database grows on the order of $N^2$. The complexity of cluster system management may thus be characterized as being on the order of $N^2$. For very large scale cluster systems (over 1,000 data processing systems), full replication of the cluster configuration database becomes unwieldy.

Another critical issue in highly available cluster systems is how to handle network partitions. Network partitions occur if a cluster is divided into two or more parts, where data processing systems in one part cannot communicate with data processing systems in another part. When a network partition occurs, it is crucial not to run multiple copies of the same application, especially a database application such as the cluster configuration database, from these (temporarily) independent parts of the cluster. A standard way of handling this problem is to require that a cluster remain offline unless it reaches quorum. The definition of quorum varies. In some implementations, a majority quorum is employed and a portion of the cluster is said to have reached quorum when the number of active servers in that portion is at least $N/2+1$. A different scheme may require a smaller number of servers to be active to reach quorum as long as the system can guarantee that at most only one portion of the cluster can reach quorum. In a very large scale cluster, the condition for quorum tends to be too restrictive. A majority quorum is used herein, although the invention is applicable to other forms of quorum.

Thus, when a network partition occurs, only the portion of the cluster (if any) which contains the majority of the data processing systems in the cluster may run applications. Stated differently, no services are provided by the cluster unless at least one half of the data processing systems within the cluster are online.

It would be desirable, therefore, to provide a mechanism for maintaining a distributed database containing cluster configuration information without incurring the costs associated with full replication. It would further be advantageous for the mechanism to be scalable and applicable to clusters of any size, even those larger than 1,000 data processing systems. It would further be advantageous to permit cluster portions to continue providing services after a network partition even if a quorum has not been reached.

SUMMARY OF THE INVENTION

It is therefore one object of the present invention to provide an improved method and apparatus for cluster system management.

It is another object of the present invention to provide an improved method and apparatus for management of very large scale clusters.

It is yet another object of the present invention to provide a method and apparatus for partially distributing cluster configuration information for managing a very large scale cluster.

The foregoing objects are achieved as is now described. A cluster system is treated as a set of resource groups, each resource group including a highly available application and the resources upon which it depends. A resource group may have between 2 and M data processing systems, where M is small relative to the cluster size N of the total cluster. Configuration and status information for the resource group is fully replicated only on those data processing systems which are members of the resource group. In the event of failure of a data processing system within the cluster, only resource groups including the failed data processing system are affected. Each resource group having a quorum of its data processing systems available continues to provide services, allowing many applications within the cluster to continue functioning while the cluster is restored.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
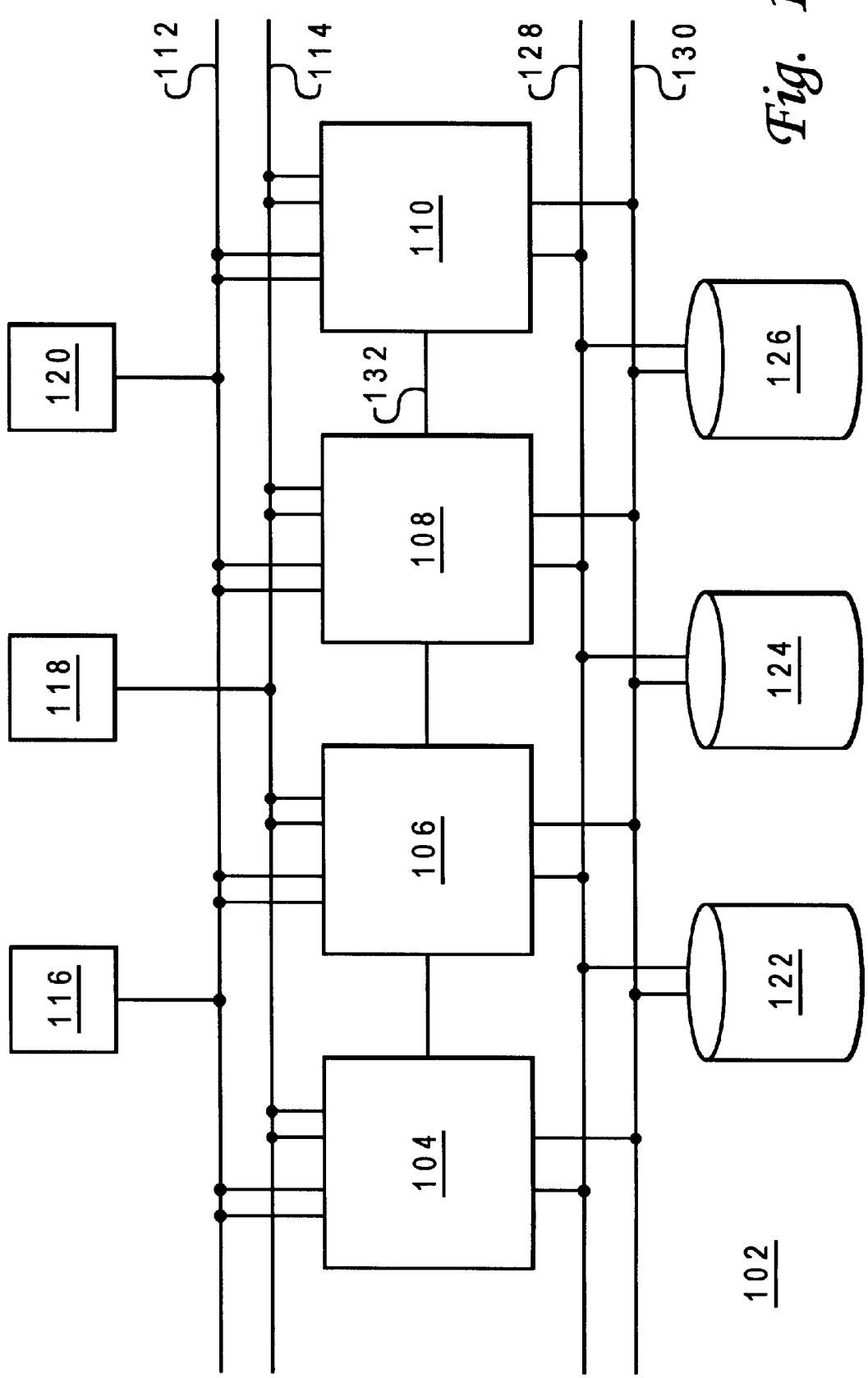
FIG. 1 depicts a block diagram of a cluster multi-processing system in which a preferred embodiment of the present invention may be implemented.

With reference now to the figures, and in particular with reference to FIG. 1, a block diagram of a cluster multi-processing system in which a preferred embodiment of the present invention may be implemented is depicted. System 102 includes a plurality of server nodes 104–110, each typically identified by a unique name. Each node 104–110 may be a symmetric multi-processor (SMP) data processing system such as a RISC System/6000® system available from International Business Machines Corporation of Armonk, N.Y. or a data processing system functioning as a Windows NT™ server.

Each node 104–110 within system 102 includes an operating system, such as the Advanced Interactive Executive (AIX®) operating system available from International Business Machines Corporation of Armonk, N.Y. or the Windows NT™ operating system available from Microsoft Corporation of Redmond, Wash. Nodes 104–110 within system 102 also include high availability cluster software capable of running on top of or in conjunction with the operating system. This high availability cluster software includes the features described below.

Nodes 104–110 are connected to public local area networks 112–114, which may be an Ethernet, Token-Ring, fiber distributed data interface (FDDI), or other network. Public networks 112–114 provide clients 116–120 with access to servers 104–110. Clients 116–120 are data processing systems which may access, each running a "front end" or client application which queries server applications running on nodes 104–110.

Typically, each node 104–110 runs server or "back end" applications which access data on shared external disks 122–126 via disk buses 128–130. Nodes 104–110 may also be connected by an additional network 132 or networks. For example, a private network may provide point-to-point connection between nodes 104–110 within system 102, with no access provided to clients 116–120. The private network, if available, may be utilized for lock traffic, and may be an Ethernet, Token-Ring, FDDI, or serial optical channel connector (SOCC) network. A serial network may also provide point-to-point communication between nodes 104–110, used for control messages and heartbeat traffic in the event that an alternative subsystem fails.

As depicted in the exemplary embodiment, system 102 may include some level of redundancy to eliminate single points of failure. For example, each node 104–110 may be connected to each public network 112–114 by two network adapters (not shown): a service adapter providing the primary active connection between a node and network and a standby adapter which substitutes for the service adapter in the event that the service adapter fails. Thus, when a resource within system 102 becomes unavailable, alternative resources may be quickly substituted for the failed resource.

Those of ordinary skill in the art will appreciate that the hardware depicted in the exemplary embodiment of FIG. 1 may vary. For example, a system may include more or fewer nodes, additional clients, and/or other connections not shown. Additionally, system 102 in accordance with the present invention includes reliable communications and synchronizations among data processing systems 104–110, and an integrated cluster system management facility, described in further detail below.

Referring to FIGS. 2A–2H, diagrams of configuration information distribution among cluster system data processing systems and resource groups in accordance with a preferred embodiment of the present invention is depicted. In the present invention, the cluster is treated as a system of resource groups and cluster configuration information for each data processing system within a resource group is replicated only to all other data processing systems in that resource group.

One major use of cluster configuration information is to make cluster resources highly available. As an example, if a data processing system within a cluster fails, applications on that data processing system will migrate to other data processing systems. Therefore, services provided by a failed data processing system will, after a brief interruption, be continuously available. For an application or other resource to be highly available, a number of data processing systems within the cluster are configured to run that application or resource, although usually at most only one data processing system manages one highly available application at any single instant in time.

In accordance with the present invention, a highly available application and all those resources upon which it depends form a resource group. Each resource group has an ordered list of data processing systems which may manage the group. The number of data processing systems within a resource group varies from 2 to M, where M is typically very small as compared to the cluster size N for a large cluster. The configuration and status information is organized as configuration objects within a database, with each highly available resource group having a configuration and status object. The configuration and status object for a resource group has an associated list of owners, which is identical to the list of data processing systems which may manage the corresponding resource group. The configuration and status information object is replicated only to data processing systems within the list of owners.

Figure 2A:
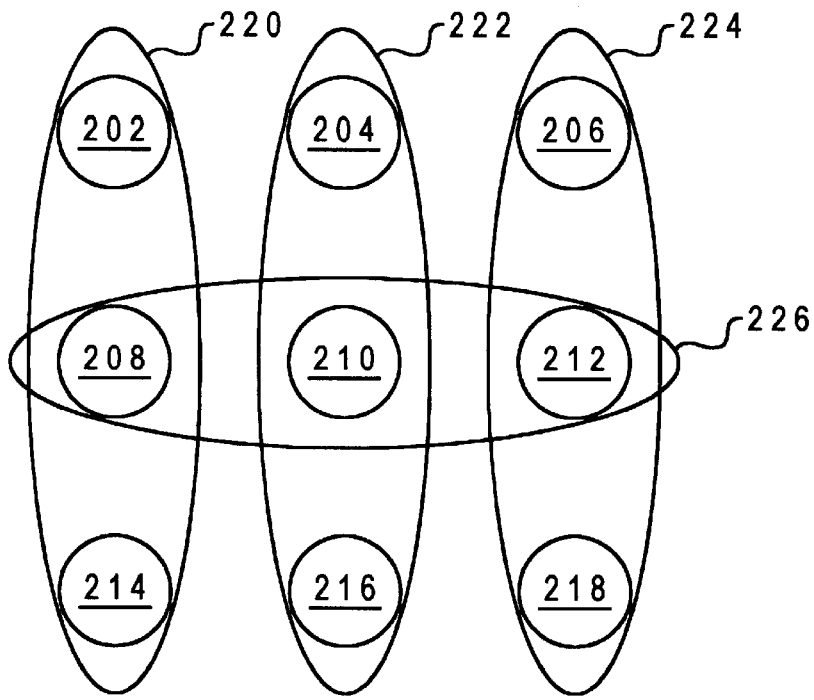
FIGS. 2A–2H are diagrams of configuration information distribution among cluster system data processing systems and resource groups in accordance with a preferred embodiment of the present invention.

The exemplary embodiment of FIG. 2A depicts nine data processing systems 202–218 organized as four resource groups 220–226. Within each resource group 220–226, typically only one data processing system manages a given application for that resource group at any given time. However, other data processing systems are designated to assume management of the application should the primary data processing system fail. A configuration object for each resource group 220–226 is replicated to each data processing system within the resource group. Each data processing system within the resource group is listed as an owner of the configuration object for the resource group. The configuration object contains cluster configuration and status information relevant to the resource group or resource, which includes: topology information such as data processing systems, networks, network interface cards (adapters), and network connectivity information; resource group information such as application packages for an application type of resource, shared disks for a shared disk type of resource, data processing system and disk connectivity information, service IP addresses for a service IP address types of resource, data processing systems where applications are installed and configured, management policies, management rules, and resource dependency relationships; and cluster system status information such as status of data processing systems, status of networks, status of network interface cards, status of shared disks, status of applications, and status of event processing. A configuration object may also contain rules for adding/modifying/deleting data processing systems, networks, network interface cards, shared disks, resource groups, and resources, as well as rules for evaluating resource dependency.

Figure 2B:
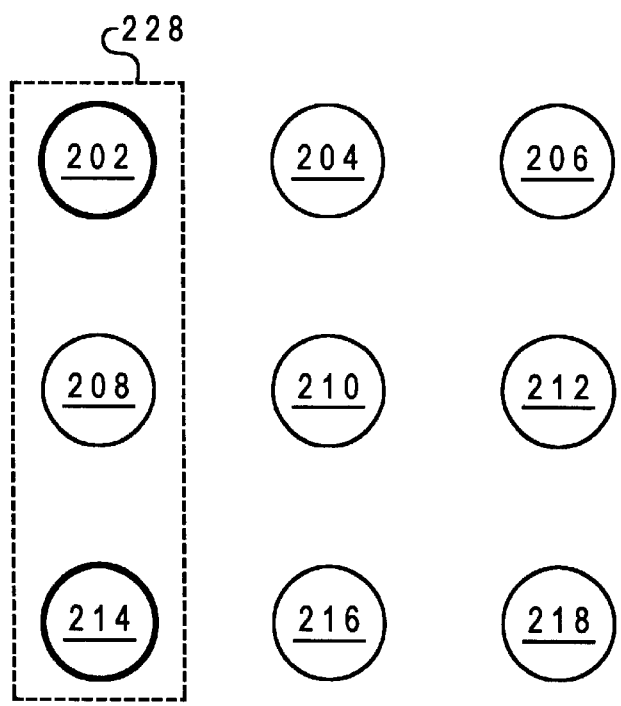

FIGS. 2B through 2H illustrate replication of status and performance information for a given data processing system within a resource group. As shown in FIG. 2B, data processing system 202 is a member of resource group 220. Accordingly, configuration and status information for data processing system 202 is replicated among other data processing systems within the resource group, including data processing systems 208 and 214. The configuration object for any application managed by data processing system 202 lists data processing systems 202, 208, and 214 as owners within an owner list associated with the configuration object.

Data processing system 214 is also a member of resource group 220, and therefore configuration and status information for data processing system 214 is also replicated to data processing systems 202 and 208, and configuration objects for applications managed by data processing system 214 list data processing systems 202, 208, and 214 as owners.

Figure 2C:
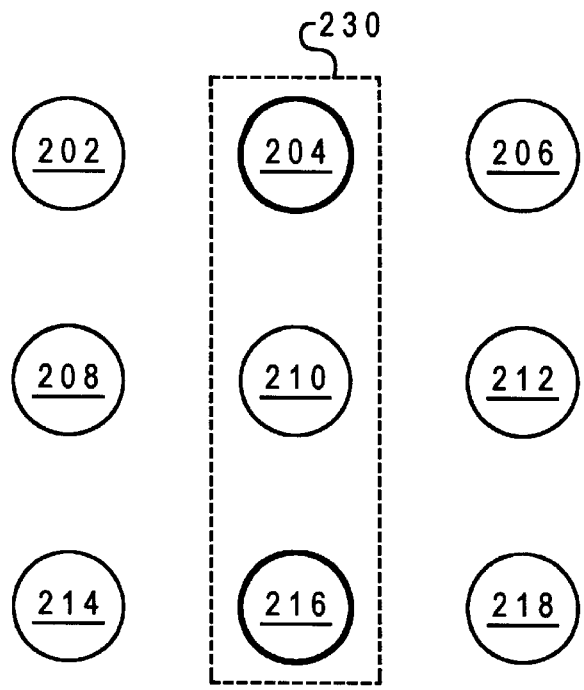
Figure 2D:
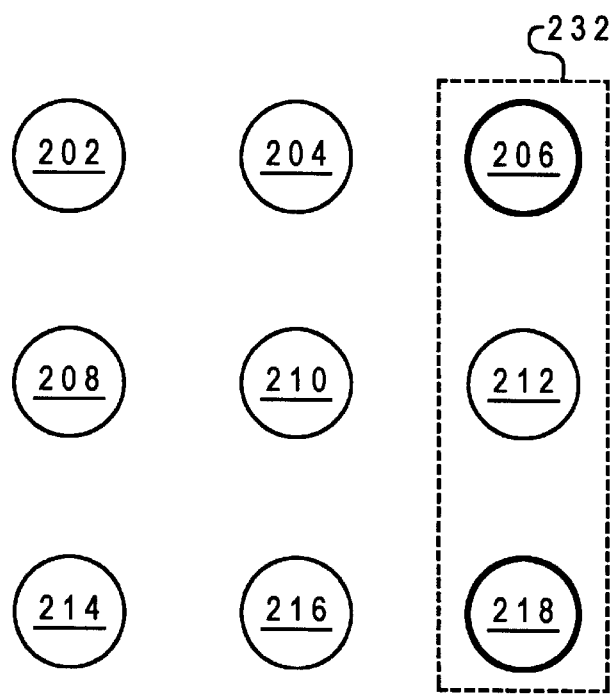

FIGS. 2C and 2D similarly illustrate replication of configuration information for data processing systems 204 and 216 of resource group 222 and data processing systems 206 and 218 of resource group 224, respectively. Configuration and status information for data processing systems 204 and 216 are replicated on each of data processing systems 204, 210, and 216, while configuration and status information for data processing systems 206 and 218 are replicated on each of data processing systems 206, 212, and 218. Applications managed by data processing system 204 or 216 have a configuration object owners list including data processing systems 204, 210, and 216, and the configuration objects themselves are replicated to each of data processing systems 204, 210, and 216. Similarly, applications managed by data processing system 206 or 218 have a configuration object owners list designating data processing systems 206, 212, and 218 as owners with the configuration objects replicated to each of data processing systems 206, 212, and 218.

Figure 2E:
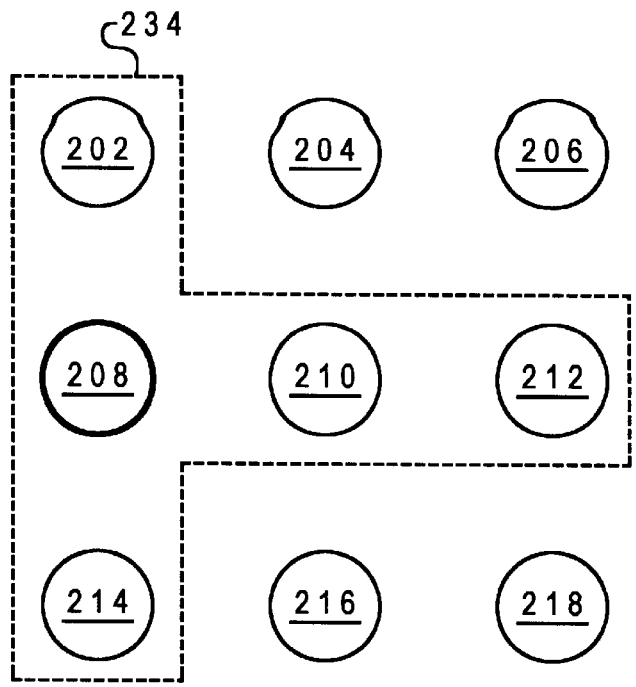

FIG. 2E illustrates replication of information where a data processing system 208 belongs to two or more overlapping resource groups 220 and 226. Configuration and status information for data processing system 208 is replicated to each data processing system belonging to at least one resource group including data processing system 208, which includes resource groups 220 and 226 and therefore data processing systems 202, 210, 212, and 214. Configuration objects for applications managed by data processing system 208 have an owners list including each of the data processing systems belonging to a corresponding resource group, and are replicated to each of those data processing systems. Thus, for example, an application managed by data processing system 208 which is part of resource group 220 has a configuration object owners list identifying data processing systems 202, 208, and 214 as owners. The configuration object for that application is replicated on data processing systems 202, 208, and 214. An application managed by data processing system 208 which is instead part of resource group 226 has a configuration object owners list identifying data processing systems 208, 210, and 212 as owners, with the configuration object for that application being replicated on data processing systems 208, 210, and 212.

Figure 2F:
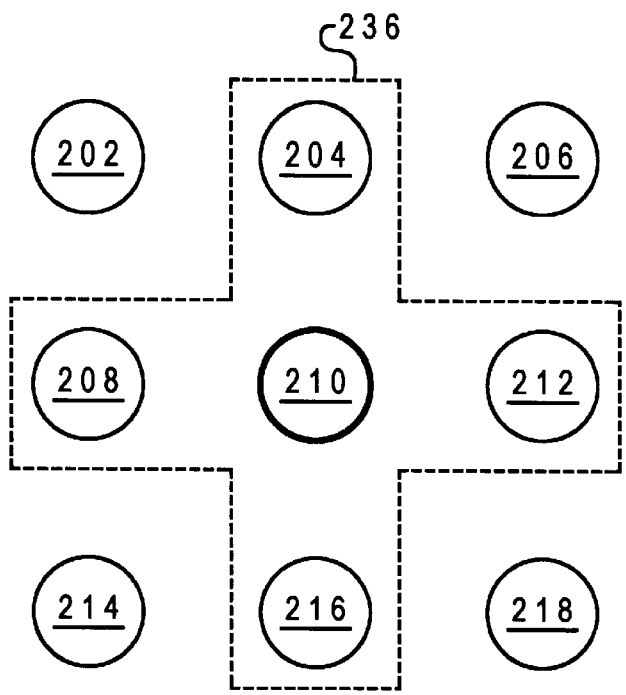
Figure 2G:
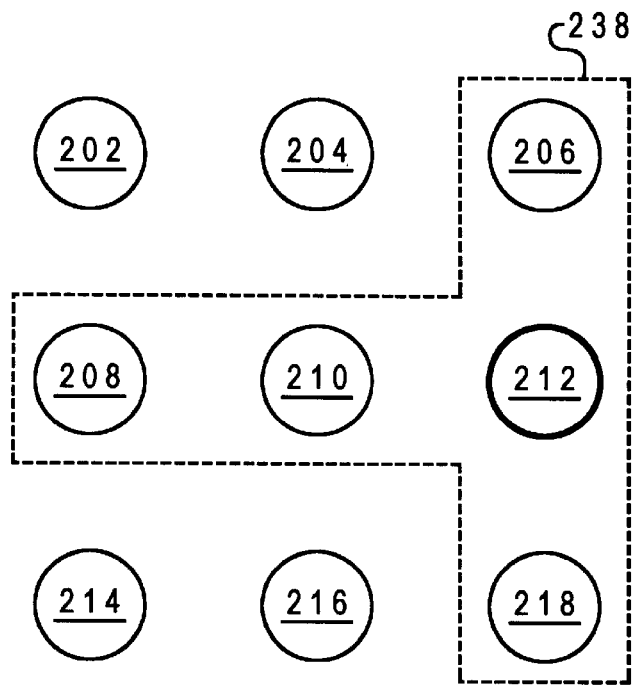
Figure 2H:
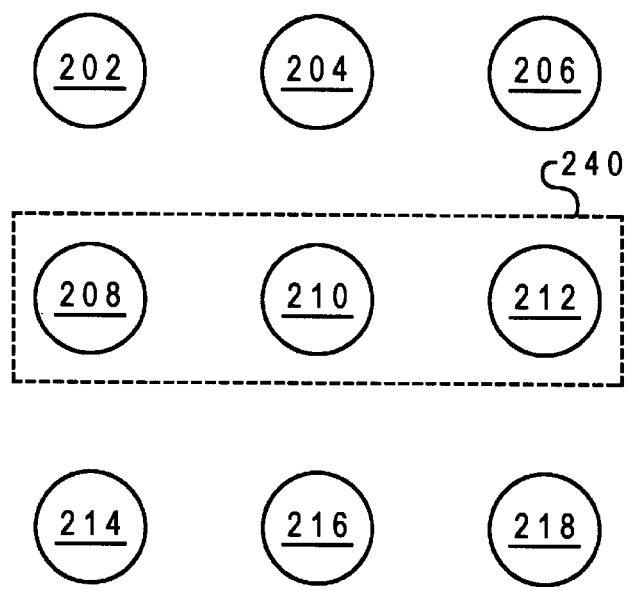

FIGS. 2F and 2G similarly illustrate replication of configuration information for data processing systems 210 and 212 belonging to two or more resource groups, groups 222 and 226 and groups 224 and 226 respectively. Configuration and status information for data processing system 210 is replicated among data processing systems 204, 208, 212, and 216, while configuration and status information for data processing system 212 is replicated on data processing systems 206, 208, 210, and 218. Configuration objects for applications managed by data processing system 210 which are part of resource group 222 have an associated owners list including data processing systems 204, 210, and 216 and are replicated to those data processing systems; configuration objects for applications managed by data processing system 210 which form part of resource group 226 have an associated owners list including data processing systems 208, 210, and 212 and are replicated to those data processing systems. Configuration objects for applications managed by data processing system 212 which are part of resource group 224 have an associated owners list including data processing systems 206, 212, and 218 and are replicated to those data processing systems; configuration objects for applications managed by data processing system 212 which form part of resource group 226 have an associated owners list including data processing systems 208, 210, and 212 and are replicated to those data processing systems.

Each configuration object/database record for a resource group is replicated only to data processing systems within the associated list of owners for the configuration object since that is where the information is most frequently employed. No data processing system in a very large cluster contains configuration and status information for all data processing systems in the entire cluster, except in the unlikely circumstance that an application utilizes all data processing systems in the cluster. In such an event, a configuration object for the application may have an owner list including all data processing systems in the cluster.

Unlike the configuration objects/database records for a resource group, the configuration and status information for a given data processing system is replicated to every data processing system within its sphere of influence (i.e. those data processing systems which form part of at least one resource group with the subject data processing system and therefore might be influenced by failure of the subject data processing system). Thus, for example, data processing systems 202 and 214 each have a sphere of influence 228 depicted in FIG. 2B including data processing systems 202, 208, and 214; data processing systems 204 and 216 each have a sphere of influence 230 depicted in FIG. 2C including data processing systems 204, 210, and 216; data processing systems 206 and 218 each have a sphere of influence 232 depicted in FIG. 2D including data processing systems 206, 212, and 218; data processing system 208 has a sphere of influence 234 depicted in FIG. 2E including data processing systems 202, 208, 210, 212, and 214; data processing system 210 has a sphere of influence 236 depicted in FIG. 2F including data processing systems 204, 208, 210, 212, and 216; and data processing system 212 has a sphere of influence 238 depicted in FIG. 2G including data processing systems 206, 208, 210, 212, and 218

When an event such as a data processing system failure occurs within a cluster configured for partial replication of configuration and status information in accordance with the present invention, only the resource groups which have the failed data processing system as an owner are affected. Necessary recovery actions are coordinated among all owners on a group by group basis. By allowing a designated list of associated owners and only those owners manage a configuration object/database record, a very large cluster is effectively managed as a collection of autonomous groups which run in parallel.

The complexity of managing a resource group having M data processing systems is $M^2$, and since M is usually much smaller than the size N of a large cluster, significant performance improvements may be achieved both in replicating a configuration and status database and in access information in a database distributed among the M data processing systems. The response time for managing system events is significantly faster sing the complexity of cluster system management has been reduced by a factor of $(M/N)^2$. With the approach of the present invention, both the number of messages transmitted in a two-phase commit protocol to update a configuration and status database and the database access time are reduced significantly by involving only a subset of data processing systems within the cluster.

A separate, cluster configuration database may be implemented on top of the resource group configuration database. The cluster configuration database would be replicated to all data processing systems within the cluster and contain cluster configuration and status information regarding networks, data processing systems, cluster system events, etc.

The partitioning of the nine-node example depicted in FIGS. 2A–2H in accordance with the present invention will result in a seven different configuration databases. A simplified example of the configuration database managed by node group 228 would be:

```
ha_resource_groups{
    ha_resource_group=ha_resource_group_220
    current_computer_id=202;
}
computers{
    computer_=202
    recovery_status="up";
    computer_id=214
    recovery_status="up";
}
```

A simplified example of the configuration database managed by node group 230 would be:

```
ha_resource_groups{
    ha_resource_group=ha_resource_group_222
    current_computer_id=204;
}
computers{
    computer_id=204
    recovery_status="up ";
    computer_id=216
    recovery_status="up";
}
```

A simplified example of the configuration database managed by node group 232 would be:

```
ha_resource_groups{
    ha_resource_group=ha_resource_group_224
    current_computer_id=206;
}
computers{
    computer_id=206
    recovery_status="up";
    computer_id=218
    recovery_status="up";
}
```

A simplified example of the configuration database managed by node group 240 would be:

```
ha_resource_groups{
    ha_resource_group=ha_resource_group_226
    current_computer_id=208;
}
computers{
    computer_id=208
    recovery_status="up";
}
```

A simplified example of the configuration database managed by node group 234 would be:

```
computers{
    computer_id=208
    recovery_status="up";
}
```

A simplified example of the configuration database managed by node group 236 would be:

```
computers{
    computer_id=210
    recovery_status="up";
}
```

And finally, a simplified example of the configuration database managed by node group 238 would be:

```
computers{
  computer_id=212
  recovery_status="up";
}
```

As an example of recovery is such a partitioned system, suppose node 208 should fail. The recovery_status of node 208 is modified to 'down' by the remaining group members of group 234, which includes nodes 202, 214, 210, and 212. The resulting configuration database for node group 234 is:

```
computers{
  computer_id=208
  recovery_status="down";
}
```

The application ha_resource_group_226, which was running on node 208 must be restarted on some other node. This application is managed by resource group 240 and therefore may be restarted on either node 210 or node 212. If node 210 is selected by the two remaining nodes in resource group 240 to run ha_resource_group_226, the resulting configuration database for node group 240 would be:

```
ha_resource_groups{
  ha_resource_group=ha_resource_group_226
  current_computer_id=210;
}
```

As an example of quorum condition within resource groups, supposed the entire nine-node cluster is restarted and initially only nodes 202 and 208 are up and running. The application ha_resource_group_220, which is managed by group 228, has reached quorum condition. Nodes 202 and 208 may determine between themselves which node should run ha_resource_group_220. This approach allows ha_resource_group_220 to run without compromising data integrity even though the cluster as a whole does not have quorum—i.e. only 2 nodes are up among the total of nine nodes. The application ha_resource_group_226, on the other hand, which is managed by group 240, has one one node (node 208) within the group, and therefore does not have quorum condition.

The partial replication management approach of the present invention also handles catastrophes such as network partitions better than a centralized or fully replicated scheme. With partial replication of configuration and status information only among resource group owners, each resource group within a cluster may provide services if more than one half of the data processing systems within the corresponding owner list are online. Therefore, a cluster with partial replication of configuration information may continue to provide reliable services even if broken into small pieces, each much smaller than a quorum of all data processing systems in the cluster.

By partitioning the configuration database and allowing each sub-cluster of servers to manage their configuration, a sub-cluster of servers may start providing services when it reaches "quorum," which may occur before the cluster as a whole reaches quorum. The "quorum" of resource group nodes which must be online need not necessarily be a majority of the node in the resource group, provided that at least one service may be reliably provided by the resource group. Furthermore, it may happen that the cluster may not be able to reach quorum if, for example, multiple failures occur. In such a case, sub-clusters may continue to provide their services as long as they have quorum. This is an advantage accompanying the partial replication method of the present invention, which associates quorum condition with each resource group while existing schemes associate quorum with the cluster as a whole.

Recovery actions and load balancing are performed by servers in each resource group on a per group basis. In other words, the resource allocation decisions are made by servers within a resource group. When multiple resource groups share one or more servers in common, race conditions may occur if resource allocation decisions are not coordinated. For example, FIG. 2A shows a cluster which contains four resource groups, with resource groups 220 and 226 sharing common server 208, resource groups 222 and 226 sharing common server 210, and resource groups 224 and 226 sharing common server 212. Some coordination of load allocation by the resource group managers for these resource groups should be provided.

Resource groups which share one or more servers in common must also share configuration and status information and also coordinate their resource allocation decisions. This is achieved by requiring those servers that are common to both resource groups to serialize resource allocation decisions of both groups. For example, as shown in FIG. 2E, server 208 with sphere of influence 234 is responsible for replicating configuration and status information of resource groups 220 and 226 to each other. Server 208 is also responsible for serializing resource allocation decisions of the two resource groups.

Figure 3:
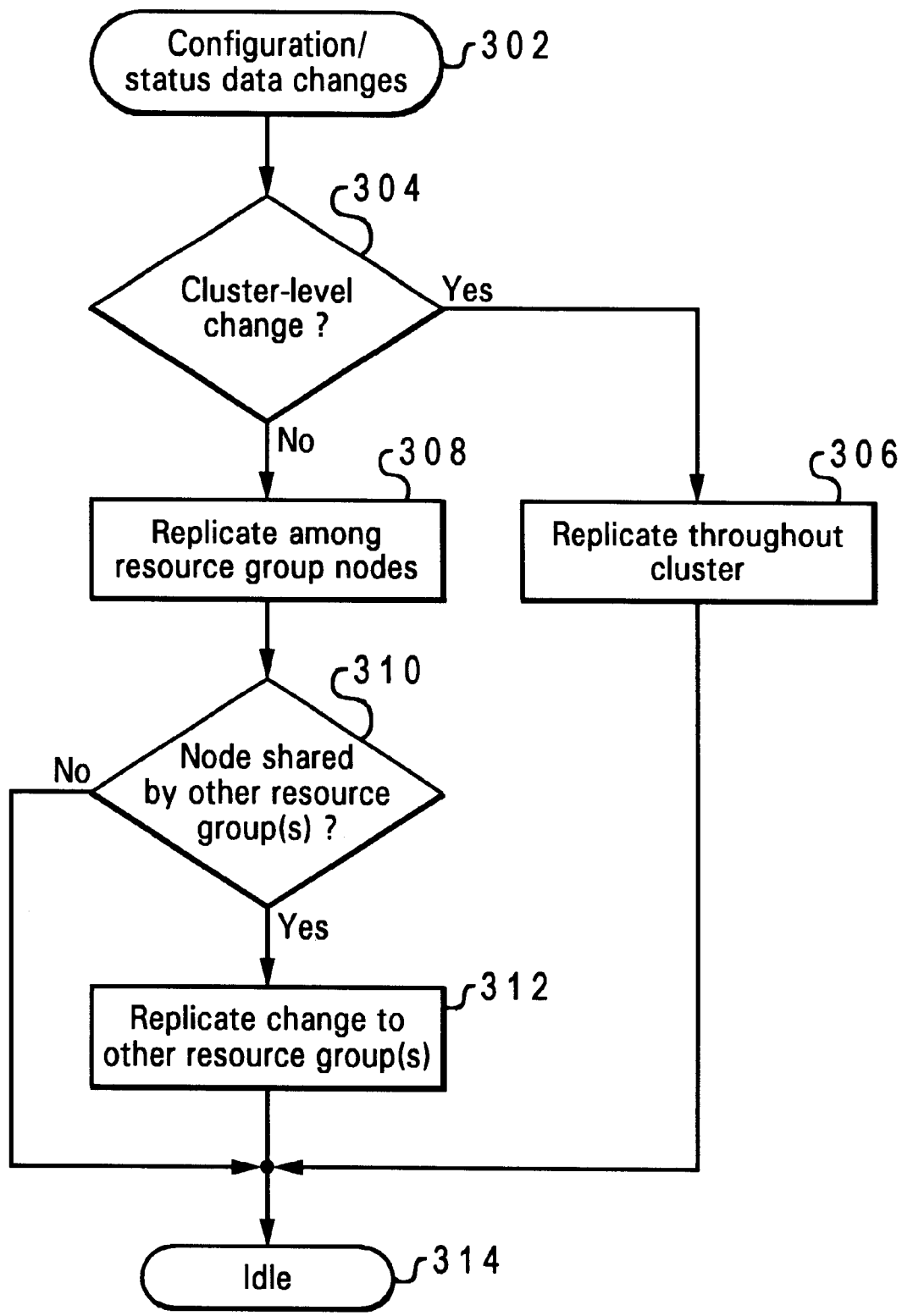
FIG. 3 depicts a high level flowchart for a process of replicating configuration and status information within a cluster containing resource groups in accordance with a preferred embodiment of the present invention.

With reference now to FIG. 3, a high level flowchart for a process of replicating configuration and status information within a cluster containing resource groups in accordance with a preferred embodiment of the present invention is depicted. The process begins at step 302, which illustrates a change in configuration or status data for a resource within the cluster system. The process then passes to step 304, which depicts a determination of whether the change is a "cluster-level" change, or a change which should be replicated throughout the cluster system. Some changes in configuration and status information—e.g., failure or reintegration of a node—should be replicated throughout the entire cluster system. For example, if a node is added to the cluster system, all pre-existing nodes, regardless of which resource groups contain the nodes, should be updated to reflect that addition. If the configuration and status information change is a cluster-level change, the process proceeds to step 306, which illustrates replicating the change throughout the cluster system If the configuration and status information change is not a cluster-level change, the process proceeds instead to step 308, which depicts replicating the change among the node within the resource group affected by the change. Configuration and status information changes which affect only an application or the associated resource group need only be replicated throughout the resource group. A resource group manager, which may simply be the node within the resource group currently having the highest precedence, is utilized to insure proper replication of the configuration and status information change.

The process next passes to step 310, which illustrates a determination of whether a node within the resource group is shared with another resource group. If so, the process proceeds to step 312, which depicts replicating the configuration and status change to all nodes within the other resource group or groups. The node or nodes shared by the different resource groups are responsible for insuring proper replication. In this respect, interlocking resource groups within the cluster system are undesirable since it requires additional replication of configuration and status information. Further replication is not necessary, however, so that the change need not be replicated to resource groups within the cluster system which have no nodes in common with the resource group affected by the change.

Once the information is fully replicated among all nodes within the affected resource group or resource groups having at least one node in common with the affected resource group, or if the affected resource group does not include any nodes shared with another resource group, the process proceeds to step 314, which illustrates the process becoming idle until a subsequent configuration and status information change is detected.

Figure 4:
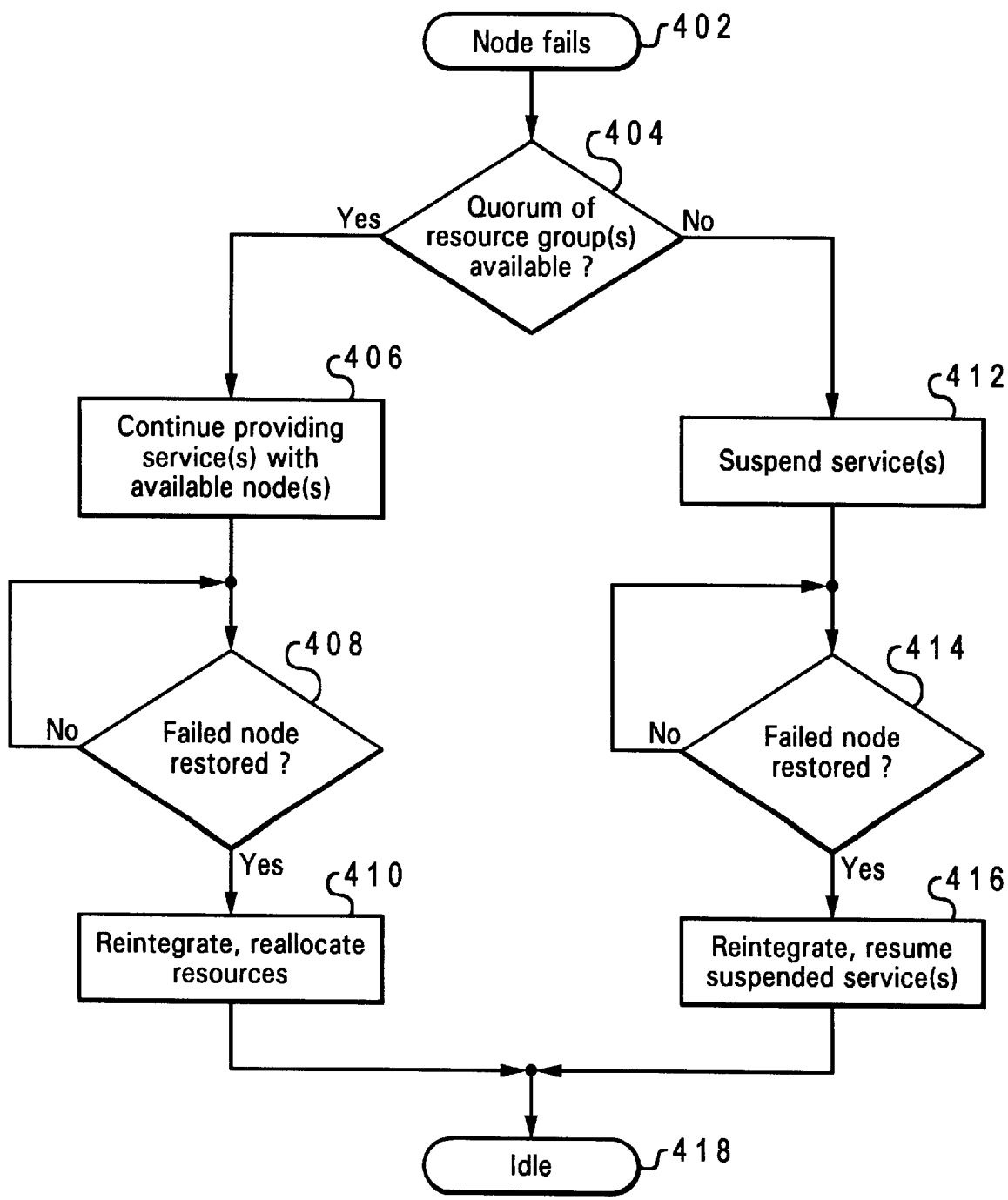
FIG. 4 is a high level flowchart for a process of handling node failure within a cluster system including resource groups in accordance with a preferred embodiment of the present invention.

Referring to FIG. 4, a high level flowchart for a process of handling node failure within a cluster system including resource groups in accordance with a preferred embodiment of the present invention is illustrated. The process begins at step 402, which depicts failure of a node within a resource group. The process then passes to step 404, which illustrates a determination of whether a "quorum" of the resource group (or resource groups, if the failed node was shared) are available. As described above, the quorum need not be a majority, as long as sufficient resources are available within the resource group to reliably provide the service or services for which the resource group is defined.

If a quorum of nodes within the resource group is available, the process proceeds to step 406, which depicts continuing providing services utilizing available nodes. Some reallocation of resources may be necessary. The process then passes to step 408, which illustrates a determination of whether the failed node has been restored. If not, the process simply returns to step 408. If so, however, the process proceeds to step 410, which depicts reintegrating the node and reallocating resources as necessary.

Referring again to step 404, if a quorum of nodes is not available, the process proceeds instead to step 412, which illustrates suspending services from the affected resource group. The process then passes to step 414, which depicts a determination of whether the failed node has been restored. As described above, if the failed node has not yet been restored, the process simply returns to step 414. Once the failed node is restored, however, the process proceeds to step 416, which illustrates reintegrating the node and resuming services from the resource group affected. From either of steps 410 or 416, the process passes to step 418, which depicts the process becoming idle until another node failure occurs.

The present invention makes use of the localization feature of a large-scale cluster system to decompose the large-scale full replication problem into a set of fully replicated sub-cluster systems. Records are only replicated to those data processing systems which need that piece of configuration information. Such partial replication reduces the costs of replication and data manipulation significantly. The cost increase only as a function of the number of data processing systems within a resource group, not as a function of the total number of data processing systems. Thus the management scheme of the present invention is highly scalable and applicable to very large cluster systems having in excess of 1,000 data processing systems.

It is important to note that while the present invention has been described in the context of a fully functional cluster multi-processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for providing highly available computing services in a cluster system, comprising:
   segregating data processing systems in the cluster system into at least one resource group, each resource group including at least two data processing systems and related resources for providing a respective computing service;
   prior to executing a desired computing service, determining whether a resource group responsible for the desired computing service is in a quorum state by determining whether a majority of data processing systems in the resource group are on line; and
   responsive to determining that the resource group responsible for providing the desired service is in the quorum state, providing the desired computing service.

2. The method of claim 1, wherein the step of determining whether a resource group responsible for the desired computing service is in a quorum state further comprises:
   determining whether at least one data processing systems in the resource group is online.

3. The method of claim 1, further comprising:
   detecting a failure of a data processing system within the cluster system.

4. The method of claim 3, further comprising:
   determining whether the resource group includes the failed data processing system.

5. The method of claim 4, further comprising:
   identifying all resource groups within the cluster system including the failed data processing system.

6. A cluster system, comprising:
   a plurality of data processing systems segregated into a plurality of resource groups, each resource group including at least two data processing systems and providing a respective computing service;
   at least one network connecting the data processing systems in the cluster system;
   a configuration database distributed among the data processing systems, each data processing system within the cluster system containing cluster-level configuration and status information and resource group configuration and status information for every resource group including the data processing system but no resource group configuration and status information for any resource group not including the data processing system; and
   a failover mechanism identifying, in response to failure of a data processing system within the cluster system, every resource group including the failed data processing system and determining, for each identified resource group including the failed data processing system, whether a quorum exists for the respective identified resource group,
   wherein each identified resource group provides a respective computing service if a quorum is available.

7. The cluster system of claim 6, further comprising:
   means for suspending the computing service provided by a resource group including the failed data processing system if a quorum of the resource group is not available.

8. The cluster system of claim 6, further comprising:

means for reintegrating the failed data processing system upon restoration.

9. A data processing system, further comprising:

a processor executing instructions for providing a computing service;

a network connection permitting the data processing system to be connected to a cluster at system segregated into a plurality of resource groups;

a memory containing configuration information identifying each resource group within the cluster system including the data processing system; and a failover mechanism detecting failure of any other data processing system within a resource group including the data processing system, the failover mechanism determining whether the resource group including the failed data processing system is in a quorum state by determining whether a majority of data processing systems in the resource group are on line and permitting the data processing system to continue providing the computing service if the resource group including the failed data processing system is in the quorum state.

10. The data processing system of claim 9, further comprising:

means for suspending the computing service if the resource group including the failed data processing system is not in the quorum state.

11. The data processing system of claim 9, further comprising:

means for serving requests for the computing service from the data processing system if the resource group including the failed data processing system is in the quorum state.

12. The data processing system of claim 9, wherein the computing service comprises a highly available application.

13. A method of responding to a data processing system failure within a cluster system segregated into a plurality of resource groups, each resource group including at least two data processing systems and an application server, comprising:

identifying every resource group including the failed data processing system;

for each resource group including the failed data processing system, determining whether the resource group is in a quorum state by determining whether a majority of data processing systems within the resource group are on line;

for each resource group including the failed data processing system which is in a quorum state, serving requests to the application server; and for each resource group including the failed data processing system which is not in a quorum state, suspending the application server.

14. The method of claim 12, wherein the step of determining whether the resource group is in a quorum state further comprises:

determining whether at least one data processing systems within the resource group is online.

15. The method of claim 12, wherein the step of determining whether the resource group is in a quorum state further comprises:

determining whether sufficient the resource group includes sufficient functioning resources to serve requests to the application server associated with the resource group.

16. A computer program product within a computer usable medium, comprising:

instructions embodied within said computer usable medium, for segregating data processing systems in a network into at least one resource group, each resource group including at least two data processing systems and related resources for providing a respective computing service;

instructions embodied within said computer usable medium, for determining whether a resource group responsible for the desired computing service is in a quorum state prior to executing a desired computing service by determining whether a majority of data processing systems in the resource group are on line; and instructions embodied within said computer usable medium, within the computer usable medium for providing the desired computing service in response to determining that the resource group responsible for providing the desired service is in the quorum state.

17. The computer program product of claim 16, wherein the instructions embodied within said computer usable medium for determining whether a resource group responsible for the desired computing service is in a quorum state further comprise:

instructions for determining whether at least one data processing systems in the resource group is online.

18. The computer program product of claim 16, wherein the instructions embodied within said computer usable medium for determining whether a resource group responsible for the desired computing service is in a quorum state further comprise:

instructions for determining the resource group responsible for providing the desired computing service includes sufficient functioning resources to serve a request for the desired computing resources.

* * * * *